United States Patent

Meier

[15] 3,671,756
[45] June 20, 1972

[54] ELECTRICAL POWER GENERATOR
[72] Inventor: Emil S. Meier, P.O. Box 83, Babcock, Wis. 54413
[22] Filed: Oct. 26, 1970
[21] Appl. No.: 84,047

[52] U.S. Cl..............................................................290/54
[51] Int. Cl.......................................................F03b 13/00
[58] Field of Search..................290/43, 44, 54, 55; 310/410, 310/46, 103

[56] References Cited

UNITED STATES PATENTS

| 2,243,555 | 5/1941 | Faus | 310/103 |
|---|---|---|---|
| 2,454,058 | 11/1948 | Hays | 290/55 UX |
| 2,463,538 | 3/1949 | Horrell | 290/54 X |
| 1,084,148 | 1/1914 | Huguenin | 310/103 |
| 3,422,297 | 1/1969 | Cotton de Bennetot et al. | 310/103 X |

Primary Examiner—Bernard A. Gilheany
Assistant Examiner—W. E. Duncanson, Jr.
Attorney—Alter, Weiss & Whitesel

[57] ABSTRACT

An air driven wheel is magnetically coupled to drive a plurality of electrical generators to generate electrical power responsive to the actuation of the wheel.

3 Claims, 3 Drawing Figures

PATENTED JUN 20 1972         3,671,756
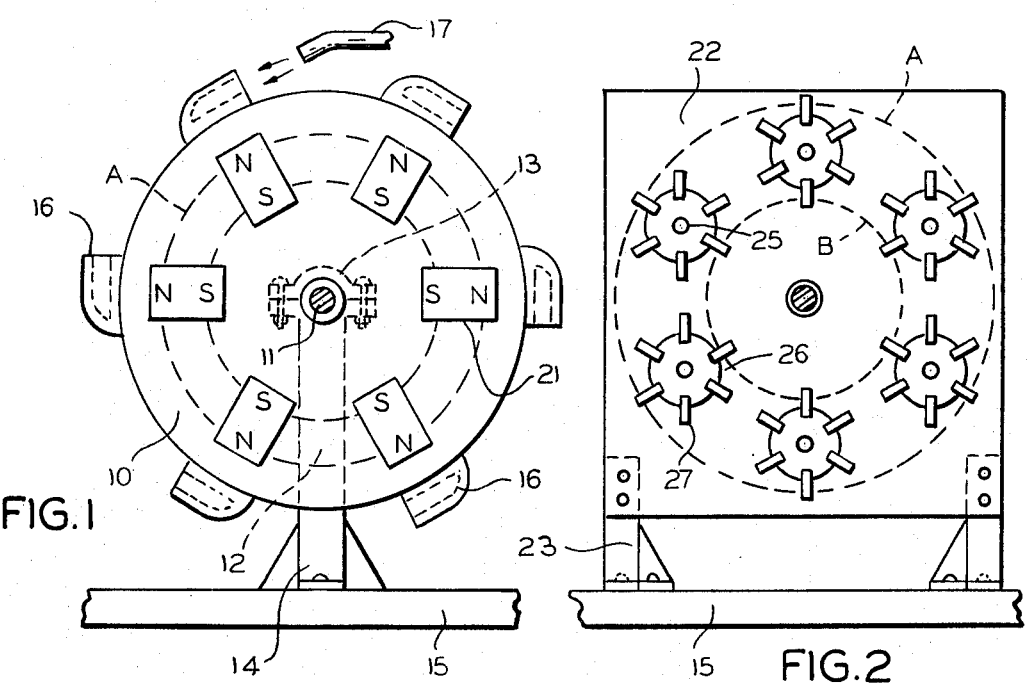
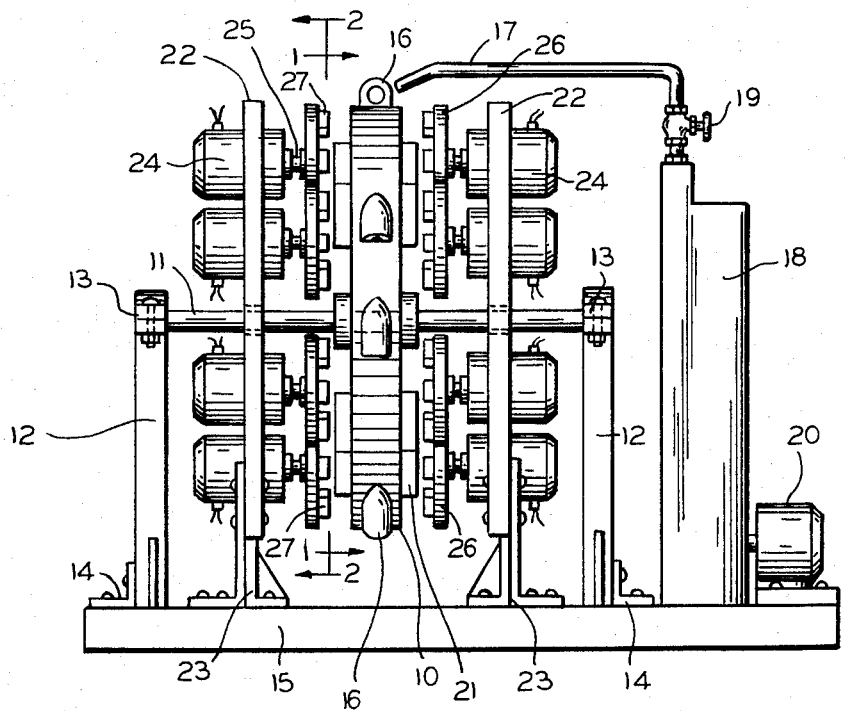
INVENTOR
EMIL S. MEIER
BY
Alter, Weiss and Whitesel
ATTORNEYS

ELECTRICAL POWER GENERATOR

My invention relates to power generators, and more particularly to pneumatically actuated, electrical power generators.

The prime object of my invention is to provide a device that will generate current utilizing two magnetically equipped surfaces, facing one another, in a magnetically attracting or repulsing relation to one another to form a magnetic coupling.

Another object of my invention is to provide a device of the character described in which one of the field structures is rotatably mounted, and the others are stationary disposed.

It is manifest to anyone familiar with magnets, that the magnets are either attracted or repulsed by one another depending on the relation of the individual magnets. It is the prime object of my invention to employ the poles of a plurality of magnets to actuate and revolve individual generators for producing electric current.

The device is simple in construction and definitely performs the purposes for which it is intended.

Other and further objects of my invention will become more apparent as the description proceeds, when taken in conjunction with the drawing, in which:

FIG. 1 is a face view of the rotatably mounted disc, taken at the line 1—1 in FIG. 3, which disc supports a plurality of magnets and is equipped with a plurality of air pockets which are mounted on the outer periphery or surface thereof;

FIG. 2 is a face view of one of the stationary plates taken at the line 2—2 in FIG. 3, supporting a plurality of generators, each equipped with a plurality of magnets; and FIG. 3 is an end view of the entire assembly with the magnets shown in direct relation with one another and spaced apart.

Similar characters of reference indicate corresponding parts throughout the several views, and referring now to the same, the character 10 shows a circular disc preferably constructed of non-conducting material, mounted on a horizontal shaft 11, supported at each end by vertical standards 12, equipped with bearings at their upper ends 13. Obviously, the bearings (not shown) may be of any conventional type to enable the disc 10 to revolve freely.

The vertical standards 12 are mounted at 14 in any efficient manner onto a bottom plate 15 for supporting the entire assembled device.

The outer periphery of the circular disc 10 is equipped with a plurality of air pockets 16, which are in alignment with a tube 17, extending from an air tank 18, which may be of any form, shape, or contour. A valve, such as manually operated valve 19 is disposed within the tube 17 for controlling the compressed air forced into the tank 18 by a conventional motor driven compressor, shown as 20 in FIG. 3. The air leaving the tube 17 comes into engagement with the air pockets 16 for revolving the disc 10.

There are a plurality of magnets 21 arcuately mounted in any convenient manner into the disc 10 and shown with the N poles extending outward toward the outer periphery of the disc 10.

There are shown a pair of vertically disposed plates 22, ridgedly mounted at 23 to the bottom plate 15. These plates 22 are also preferably constructed of a rigid non-conductive material and support a plurality of electric current generators shown as 24, in circular arrangement with the magnets 21 in the disc 10. These generators 24 have outwardly extending shafts 25 which support plates 26 onto which are mounted magnets 27, which magnets are in alignment with, but spaced from the magnets 21 in the disc 10. In a preferred embodiment, the north poles of the magnets 21 describe a first circle as plate 10 rotates. The diameter of the first circle is equivalent to the diameter of the circular locus of the outer magnets 27 of the generators 24. Similarly, the south poles of the magnets 21 describe a circle coinciding with the locus of the inner magnets 27 of the generators 24. Thus, the magnets 21, in rotating, attract or repel magnets 27 to force the rotation of the armature of the generators.

The device may be constructed with one vertical plate 22 supporting the generators 24, if desired.

The purpose and function of the assembled device, described above, and illustrated in an assembled position in FIG. 3, is to release the compressed air from the tank 18, which air is controlled by the manually operated valve 19, through the tube 17, so the air will contact the air pockets 16 on the outer periphery of the disc 10 to revolve the disc 10 and with it the magnets 21, and as these magnets 21 pass the magnets 27 mounted onto the discs 26 of the generators 24, it will cause the discs 26 of the generators 24 to revolve, thereby causing electric current to be generated by all generators 24, at the same time.

Although I have shown a specific construction and arrangement of the parts constituting my invention, I am fully cognizant of the fact that many changes may be made without effecting the operativeness of the device, and I reserve the rights to make such changes as I may deem necessary without departing from the spirit of my invention or the scope of the appended claims.

Having thus described my invention, what I claim and desire to secure by Letters Patent in the United States, is:

1. In an electrical power generator arrangement, said arrangement comprising a plurality of electrical generators said plurality of generators arcuately positioned on a stand, the shaft of each said generator having first magnetic means attached thereto, drive means for causing said generator shafts to rotate, second magnetic means on said drive means for coupling said drive means to said generator shaft means to effect the rotation of said shaft responsive to the operation of said drive means, said drive means comprising a first disk means, said first disk means having the second magnet means therein positioned to pass contiguously to the first magnetic means of each of said generators as said first disk means rotates, and each of said plurality of generators including a second disk means for mounting said first magnetic means to describe a first circle having a diameter equal to the diameter described by the first poles of said second magnetic means when said first disk means rotates and a second circle having a diameter equal to the diameter described by the second poles of said second magnetic means.

2. In an electrical power generator arrangement, said arrangement comprising at least one electrical generator, the shaft of said generator having first magnetic means attached thereto, drive means for causing the generator shaft of said at least one electrical generator to rotate, second magnetic means on said drive means for coupling said drive means to said generator shaft means to effect rotation of said shaft responsive to the operation of said drive means, said drive means comprising first disk means, said first disk means having said second magnetic means therein positioned to pass contiguously to the first magnet means as the first disk means rotates, compressed air means for causing said first disk means to rotate, said compressed air means comprising a source of compressed air, air cup means extending from the periphery of said first disk means for receiving and reacting to said directed compressed air, means for directing the flow of compressed air from said source toward said air cup means to force said first disk means to rotate, said second magnet means comprising a plurality of magnets accurately arranged in said first disk means, a first pole of said arcuately arranged plurality of magnets facing the outer periphery of said first disk means and the said second pole of said arcuately arranged plurality of magnets facing toward the center of said first disk means, the said at least one generator being mounted on a first stand, a second disk means mounted to the shaft of said at least one generator, and a plurality of magnets accurately mounted on the second disk means so that the magnetic poles of said plurality of magnets mounted on said second disk are located within a certain circle having a diameter equal to the distance between said first and second poles of said second magnet means, and said second disk means being mounted so that the magnets thereon are juxtaposed to the magnets mounted on said first disk means during some part of a circle described by the magnets mounted on said first disk means when said first disk means is operated to rotate.

3. The arrangement of claim 2 wherein a plurality of generators are accurately positioned on said stand so that said first magnet means of said second disk describe a first circle having a diameter equal to the diameter described by the first poles of said second magnet means when said first disk means rotates and a second circle having a diameter equal to the diameter described by said second poles of said second magnet means.

* * * * *